US008705095B2

(12) United States Patent
Miyazaki

(10) Patent No.: US 8,705,095 B2
(45) Date of Patent: Apr. 22, 2014

(54) PRINT CONTROL APPARATUS, PRINTING SYSTEM, AND COMPUTER READABLE MEDIUM STORING PROGRAM FOR UTILIZING PLURAL INTERPRETERS FOR PARALLEL PROCESSING OF PRINT JOBS

(75) Inventor: Koichi Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 440 days.

(21) Appl. No.: 13/032,226

(22) Filed: Feb. 22, 2011

(65) Prior Publication Data

US 2012/0062939 A1    Mar. 15, 2012

(30) Foreign Application Priority Data

Sep. 10, 2010   (JP) ................................. 2010-202642

(51) Int. Cl.
*G06F 3/12* (2006.01)

(52) U.S. Cl.
USPC .......................... 358/1.15; 358/1.13; 715/234

(58) Field of Classification Search
USPC ............. 358/1.15, 1.1, 1.13, 1.14, 1.16, 1.17, 358/1.18, 1.5, 448; 715/201, 234, 251
See application file for complete search history.

(56) References Cited

U.S. PATENT DOCUMENTS

| 5,970,216 | A | * | 10/1999 | Tanio et al. ................... 358/1.13 |
| 6,545,766 | B1 | | 4/2003 | Shima et al. |
| 6,876,464 | B1 | * | 4/2005 | Shima .......................... 358/1.16 |
| 7,298,503 | B2 | * | 11/2007 | Christiansen et al. ....... 358/1.13 |
| 2002/0186384 | A1 | * | 12/2002 | Winston et al. ................. 358/1.5 |
| 2005/0024677 | A1 | * | 2/2005 | Miura et al. ................... 358/1.15 |
| 2007/0127060 | A1 | * | 6/2007 | Matsuo ......................... 358/1.15 |
| 2010/0202008 | A1 | * | 8/2010 | Aronshtam et al. ......... 358/1.15 |

FOREIGN PATENT DOCUMENTS

| JP | A 10-091366 | 4/1998 |
| JP | A 2002-215352 | 8/2002 |
| JP | B2 3553985 | 8/2004 |

* cited by examiner

*Primary Examiner* — David S Cammack
(74) *Attorney, Agent, or Firm* — Oliff PLC

(57) ABSTRACT

A print control apparatus includes plural conversion units each of which is capable of activating plural drawing processing units that generate print data, a memory that stores a print instruction in a print queue, a judging unit that judges whether or not the number of pages of the print instruction is larger than a set threshold, an assigning unit that assigns the print instruction that has been judged to have a number of pages equal to or smaller than the set threshold to one or more of the plural conversion units, and a selecting unit that selects, if the assigning unit has assigned the print instruction having a number of pages equal to or smaller than the set threshold to one or more of the plural conversion units, a print instruction having a number of pages equal to or smaller than the set threshold.

10 Claims, 8 Drawing Sheets

FIG. 6

| TYPE OF PDL | THRESHOLD α (NUMBER OF PAGES) |
|---|---|
| PostScript | 8 |
| PDF | 12 |
| PCL | 16 |

FIG. 7

| PRINT PRIORITY | NAME OF PRINT JOB | NUMBER OF PAGES | TYPE OF PDL |
|---|---|---|---|
| 1 | PRINT JOB A | 5 | PostScript |
| 2 | PRINT JOB B | 1000 | PDF |
| 3 | PRINT JOB C | 6 | PDF |
| 4 | PRINT JOB D | 4 | PostScript |

PRINT CONTROL APPARATUS, PRINTING SYSTEM, AND COMPUTER READABLE MEDIUM STORING PROGRAM FOR UTILIZING PLURAL INTERPRETERS FOR PARALLEL PROCESSING OF PRINT JOBS

CROSS-REFERENCE TO RELATED APPLICATIONS

This application is based on and claims priority under 35 USC 119 from Japanese Patent Application No. 2010-202642 filed Sep. 10, 2010.

BACKGROUND (i) Technical Field

The present invention relates to a print control apparatus, a printing system, and a computer readable medium storing a program.

SUMMARY

According to an aspect of the invention, there is provided a print control apparatus including: plural conversion units each of which is capable of activating plural drawing processing units that generate print data by performing a drawing process on the basis of a print instruction; a memory that stores a print instruction in a print queue; a judging unit that judges whether or not the number of pages of the print instruction is larger than a set threshold; an assigning unit that assigns the print instruction that has been judged to have a number of pages equal to or smaller than the set threshold by the judging unit to one or more of the plural conversion units; and a selecting unit that selects, if the assigning unit has assigned the print instruction having a number of pages equal to or smaller than the set threshold to one or more of the plural conversion units, a print instruction having a number of pages equal to or smaller than the set threshold from among subsequent print instructions stored in the memory. The assigning unit assigns the print instruction selected by the selecting unit to one of the plural conversion units except the conversion unit to which another print instruction has already been assigned.

BRIEF DESCRIPTION OF THE DRAWINGS

Exemplary embodiments of the present invention will be described in detail based on the following figures, wherein:

FIG. 6 is a diagram illustrating an example of the case of setting thresholds in accordance with the type of PDL;

FIG. 7 is a diagram illustrating an example of print jobs in a print queue stored in a print job memory;

DETAILED DESCRIPTION

Hereinafter, an exemplary embodiment of the present invention will be described in detail with reference to the attached drawings.

Figure 1:
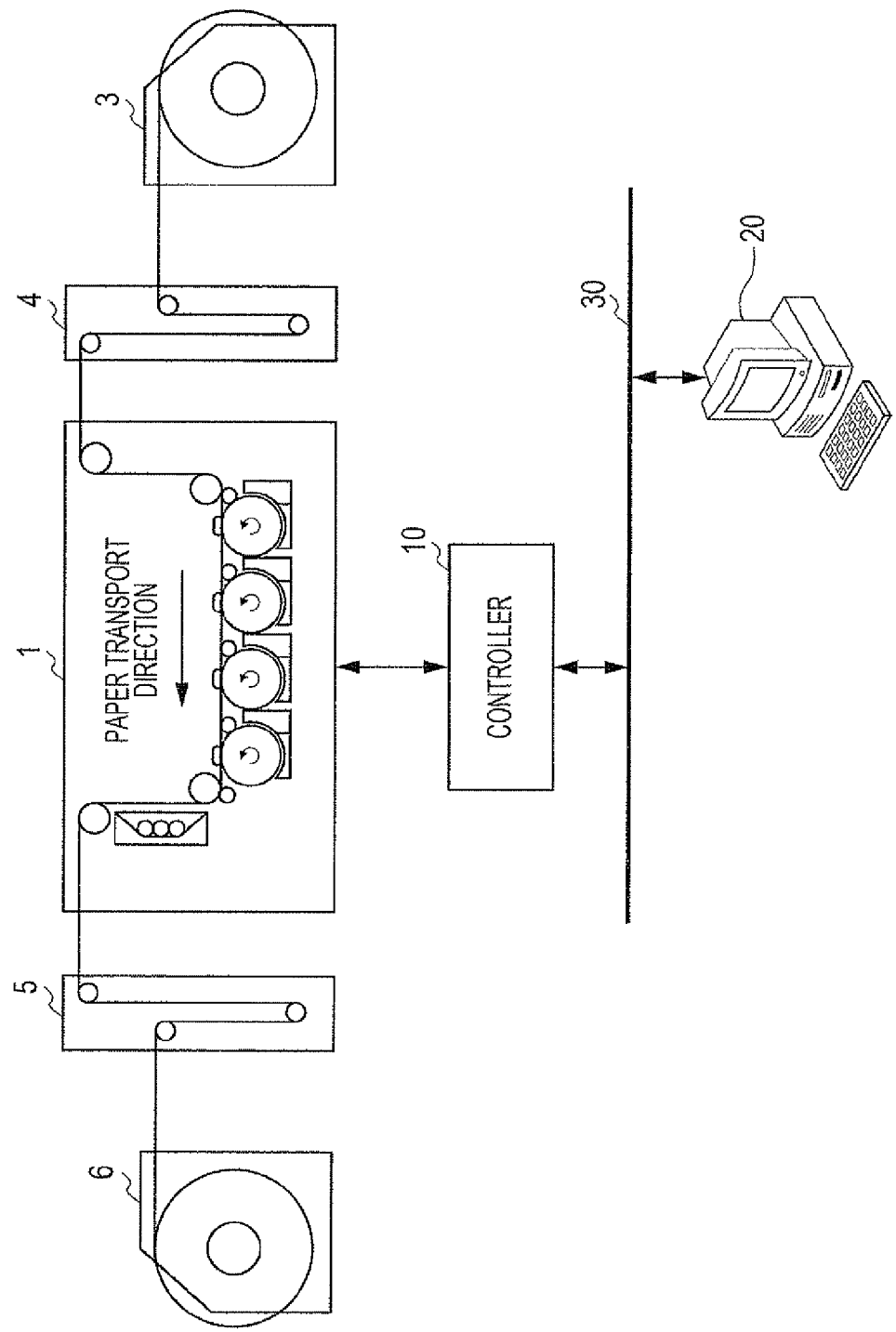
FIG. 1 is a diagram illustrating a system configuration of a printing system according to an exemplary embodiment of the present invention.

FIG. 1 is a diagram illustrating an example configuration of a printing system according to an exemplary embodiment of the present invention. As illustrated in FIG. 1, the printing system includes a preprocessing apparatus 3, a buffer apparatus 4, a printing apparatus 1 that performs printing on continuous paper, a buffer apparatus 5, a post-processing apparatus 6, a controller 10, and a terminal apparatus 20.

The preprocessing apparatus 3 performs preprocessing, such as feeding of continuous paper on which nothing is printed. The post-processing apparatus 6 performs post-processing, such as winding of continuous paper on which printing has been performed. The buffer apparatuses 4 and 5 are provided for maintaining the tension of continuous paper between the preprocessing apparatus 3 and the printing apparatus 1 and between the printing apparatus 1 and the post-processing apparatus 6.

The terminal apparatus 20 generates a print job (print instruction) and transmits it to the controller 10 via a network 30. The controller 10 functions as a print control apparatus that controls a print operation performed by the printing apparatus 1 on the basis of a print job transmitted from the terminal apparatus 20. The printing apparatus 1 outputs images based on the print job onto continuous paper on the basis of the control performed by the controller 10.

Next, the hardware configuration of the above-described controller 10 will be described with reference to the block diagram illustrated in FIG. 2.

Figure 2:
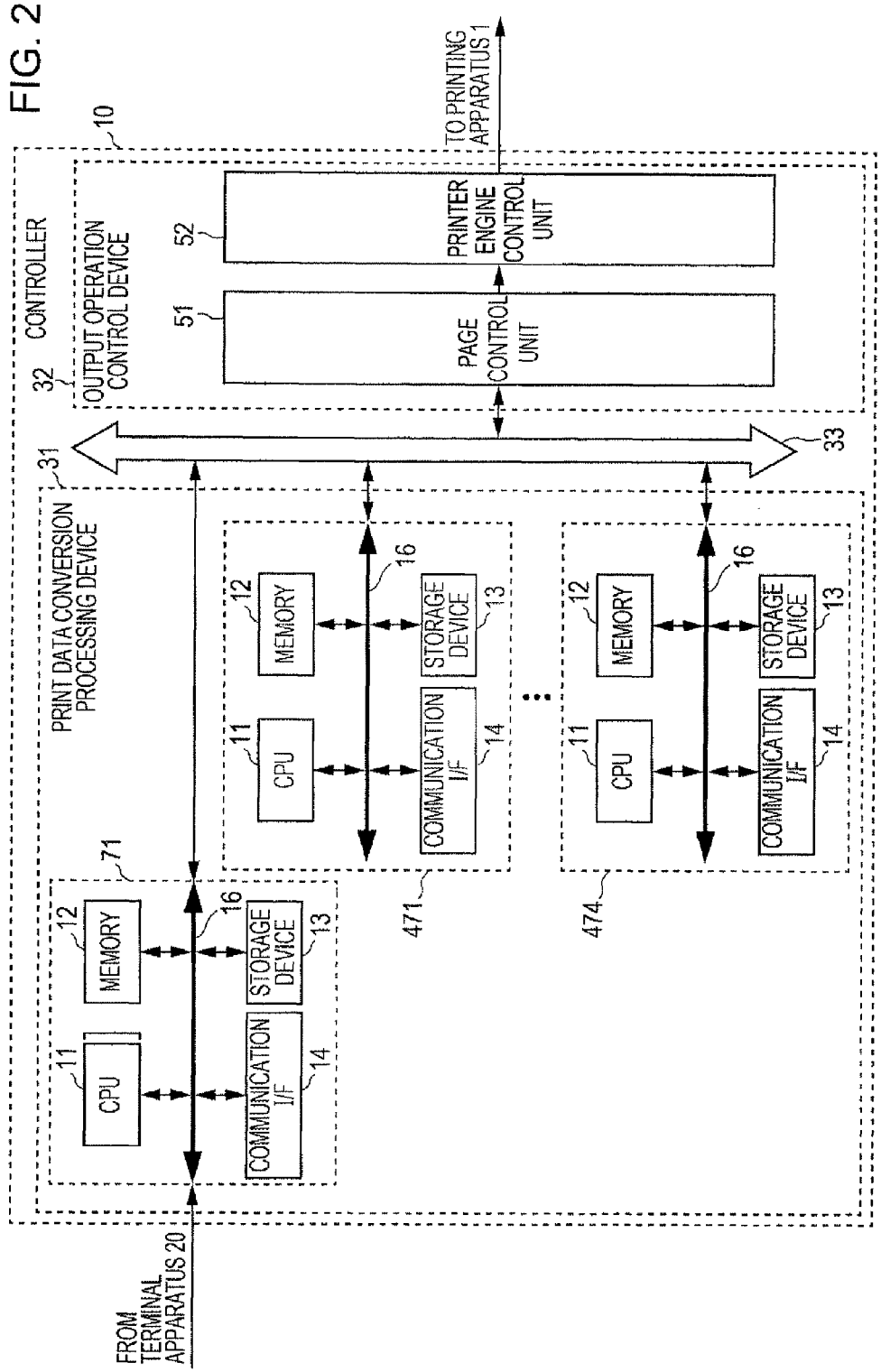
FIG. 2 is a block diagram illustrating a hardware configuration of a controller according to an exemplary embodiment of the present invention.

As illustrated in FIG. 2, the controller 10 according to this exemplary embodiment includes a print data conversion processing device 31 and an output operation control device 32.

The print data conversion processing device 31 converts a print job received from the terminal apparatus 20 into print data made up of a raster image or the like, such as a bitmap image. The output operation control device 32 executes print processing by controlling the printing apparatus 1 on the basis of the print data obtained through the conversion performed by the print data conversion processing device 31.

The print data conversion processing device 31 includes a control unit 71 and four controller boards 471 to 474. Here, a description will be given under the assumption that the number of controller boards is four, but the number of controller boards is not limited to four.

Each of the control unit 71 and the controller boards 471 to 474 includes a central processing unit (CPU) 11, a memory 12, a storage device 13 such as a hard disk drive (HDD), and a communication interface (I/F) 14 that transmits and receives data via a network. These elements are mutually connected via a control bus 16. In the configuration illustrated in FIG. 2, each of the control unit 71 and the controller boards 471 to 474 is operated by the single CPU 11. Alternatively, a multi-CPU structure may be used, in which each of the control unit 71 and the controller boards 471 to 474 is operated by plural CPUs.

The CPUs 11 execute predetermined processing on the basis of control programs stored in the memories 12 or the storage devices 13, thereby controlling the operations of the control unit 71 and the controller boards 471 to 474, respectively. According to this exemplary embodiment, each of the CPUs 11 reads and executes the control program stored in the memory 12 or the storage device 13. Alternatively, the program may be stored in a storage medium, such as a compact disc read only memory (CD-ROM), and may be provided to the CPU 11.

Figure 3:
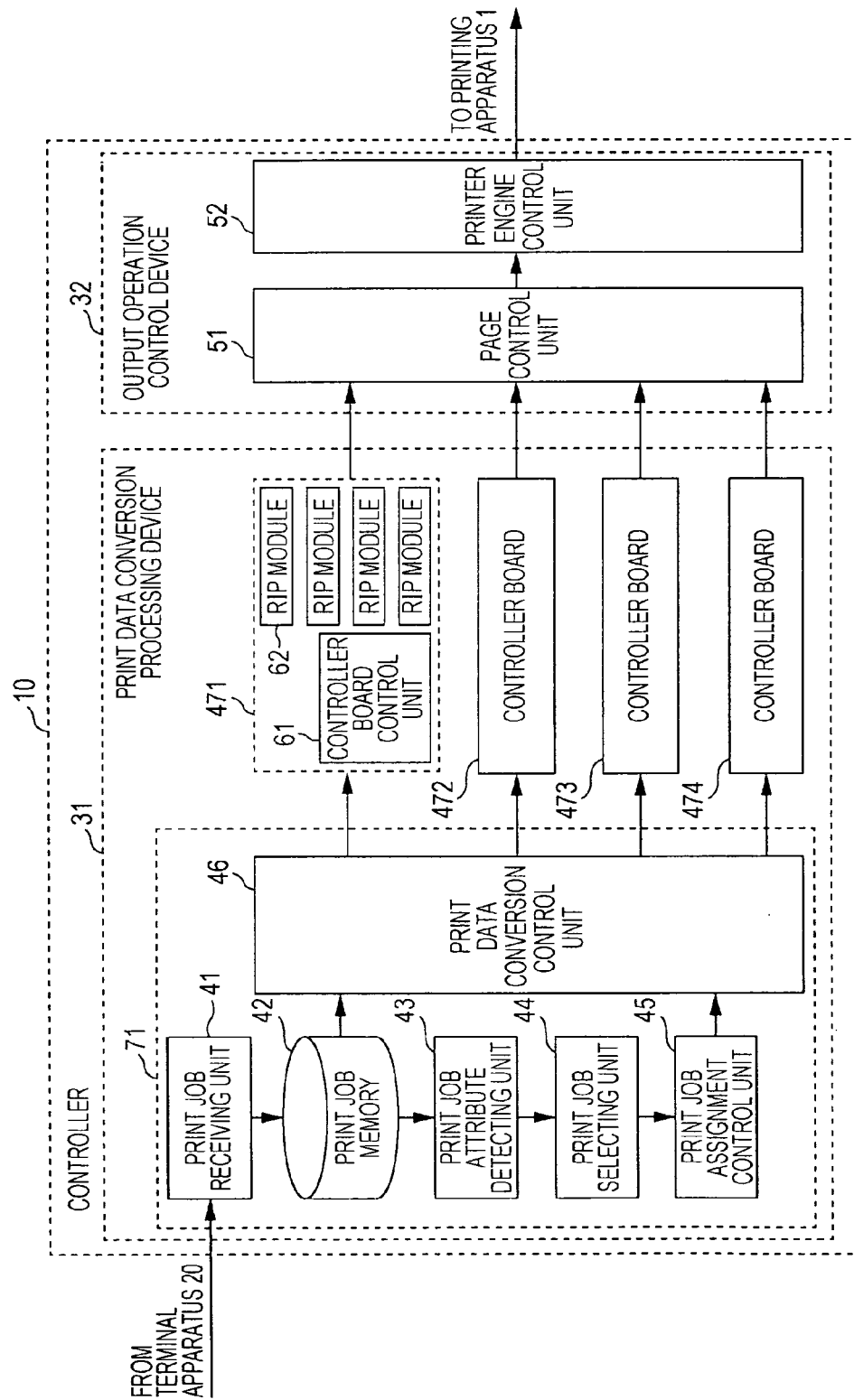
FIG. 3 is a block diagram illustrating a functional configuration of the controller according to an exemplary embodiment of the present invention.

FIG. 3 is a block diagram illustrating a functional configuration of the controller 10 that is realized by executing the foregoing control programs.

Referring to FIG. 3, the control unit 71 includes a print job receiving unit 41, a print job memory 42, a print job attribute detecting unit 43, a print job selecting unit 44, a print job assignment control unit 45, and a print data conversion control unit 46. Each of the controller boards (print data conversion units) 471 to 474 includes a controller board control unit 61 and plural raster image processing (RIP) modules 62.

The print job receiving unit 41 receives a print job described in a page description language (PDL) from the terminal apparatus 20 and causes the print job to be stored in the print job memory 42. The print job memory 42 stores a print job in a print queue received by the print job receiving unit 41. Here, PDL is a language for describing the content to be printed in a print job.

The print job attribute detecting unit 43 detects attribute information of a print job in a print queue (information about the number of pages, the type of PDL described, etc.) stored in the print job memory 42.

The print job selecting unit 44 determines a print job to be printed on the basis of the number of pages and the type of PDL of the print job, and information about the controller board configuration. Here, the information about the controller board configuration is information about the number of controller boards 471 to 474, the number of RIP modules 62 for respective types of PDL operable in each of the controller boards 471 to 474, etc.

The print job assignment control unit 45 determines which of the controller boards 471 to 474 the print job selected by the print job selecting unit 44 is to be assigned.

The print data conversion control unit 46 transfers a print job stored in the print job memory 42 to the controller boards 471 to 474 on the basis of the assignment result determined by the print job assignment control unit 45, and executes a process of converting the print job into print data.

Prior to conversion of the print job into print data, the print data conversion control unit 46 specifies the type of PDL of the RIP module 62 that is to be activated in each of the controller boards 471 to 474. Then, when executing a process of conversion into print data, the print data conversion control unit 46 assigns, to the controller boards 471 to 474, the print job on which the process of conversion into print data is to be executed in units of pages.

Each of the controller boards 471 to 474 is a conversion unit capable of activating plural RIP modules (drawing processing units) that perform a drawing process on the basis of a print job to generate print data. When receiving an instruction to convert a print job into print data, each of the controller boards 471 to 474 activates the RIP module 62 corresponding to the type of PDL of the print job that is to be converted, under the control performed by the controller board control unit 61.

The number of RIP modules 62 that may be activated in each controller board has an upper limit, and the upper limit varies depending on the type of PDL in which the print job to be processed is written. There are various types of PDL, such as PostScript, Portable Document Format (PDF), and Printer Control Language (PCL). As the processing load for processing the type of PDL in which the print job is described is larger, the number of RIP modules 62 that may be activated is smaller. Here, a description of a print instruction based on a certain format is handled as PDL.

The print job selecting unit 44 judges, when selecting a print job on which a process of conversion into print data is to be performed, whether or not the number of pages of the print job is larger than a set threshold.

Then, the print job assignment control unit 45 assigns the print job that has been judged to have a number of pages equal to or smaller than the set threshold by the print job selecting unit 44 (hereinafter such a job may be referred to as "short job") to one of the four controller boards 471 to 474.

After the print job having a number of pages equal to or smaller than the set threshold has been assigned to one of the four controller boards 471 to 474, the print job selecting unit 44 selects a print job having a number of pages equal to or smaller than the threshold from among subsequent print jobs stored in the print job memory 42.

Then, the print job assignment control unit 45 assigns the print job selected by the print job selecting unit 44 to one of the controller boards 471 to 474 except the controller board to which a print job has already been assigned. For example, if a print job has already been assigned to the controller board 471, the print job assignment control unit 45 assigns the print job selected from among the subsequent print jobs to the controller board 472.

Also, the print job assignment control unit 45 assigns a print job that has been judged to have a number of pages larger than the set threshold by the print job selecting unit 44 (hereinafter such a job may be referred to as "long job") to all the four controller boards 471 to 474, so that parallel processing is performed by the four controller boards 471 to 474.

The print job selecting unit 44 may use a fixed value as the threshold for judging whether the print job stored in the print job memory 42 is a short job or a long job, or may change the threshold in accordance with the type of print job.

In this exemplary embodiment, the print job assignment control unit 45 assigns a print job that has been judged to have a number of pages equal to or smaller than the set threshold (short job) to one of the four controller boards 471 to 474. Alternatively, the print job assignment control unit 45 may assign the print job to two or more of the four controller boards 471 to 474. For example, the print job assignment control unit 45 may assign a print job that has been judged to be a short job to two controller boards, that is, the controller boards 471 and 472.

The output operation control device 32 manages the print data in page units received from the print data conversion processing device 31 by using page numbers, and transfers the print data to the printing apparatus 1 according to page numbers.

The output operation control device 32 includes a page control unit 51 and a printer engine control unit 52. The page control unit 51 performs a process of sorting each piece of print data in page units received from the print data conversion processing device 31 in accordance with page numbers. The printer engine control unit 52 controls the printing apparatus 1 on the basis of the print data that has been sorted in accordance with page numbers by the page control unit 51, and executes print processing.

Under the control performed by the output operation control device 32, the printing apparatus 1 functions as an image output unit that outputs an image on the basis of print data obtained through the conversion performed by the four controller boards 471 to 474.

Figure 4:
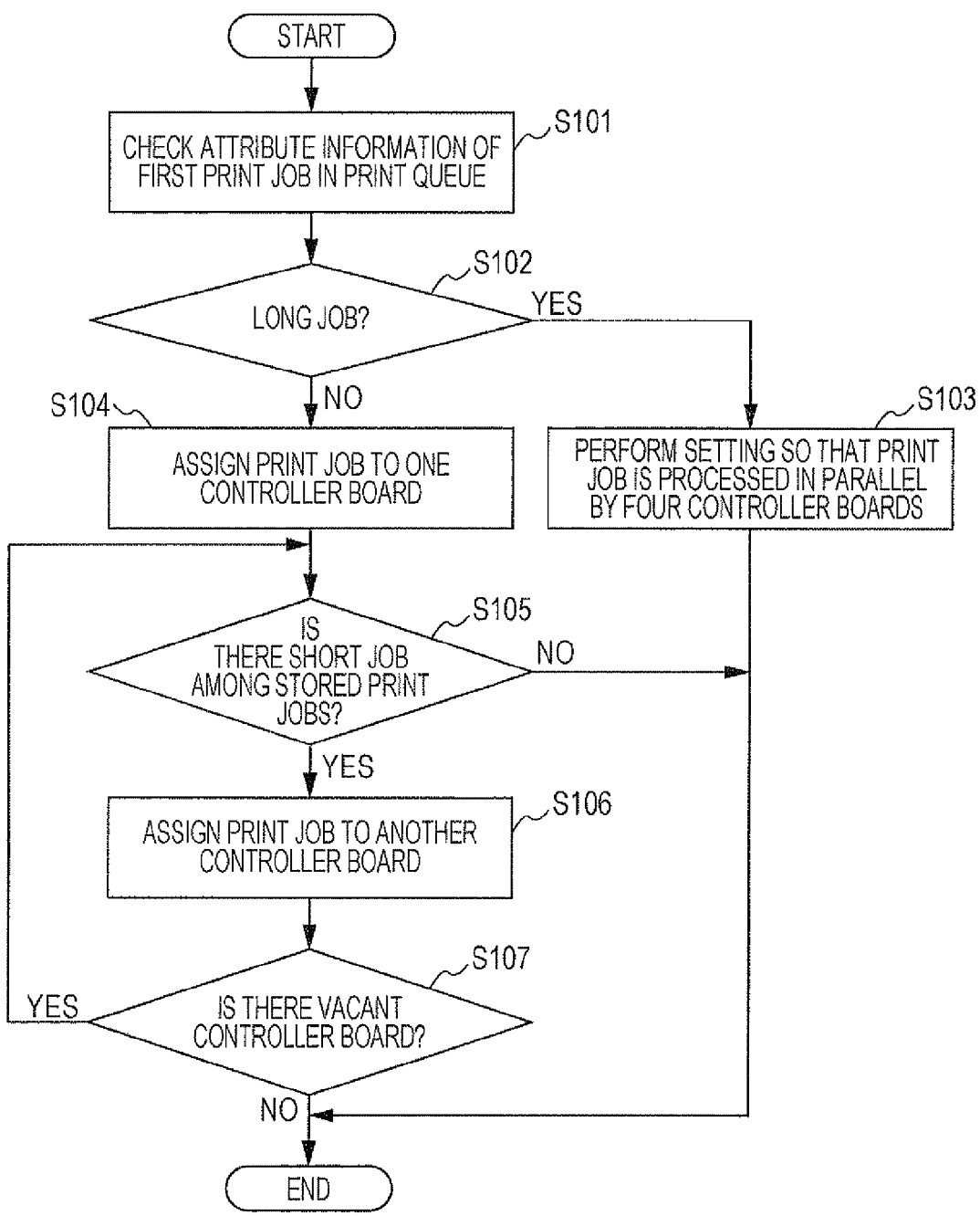
FIG. 4 is a flowchart illustrating operation of a print data conversion processing device in the printing system according to an exemplary embodiment of the present invention.

Next, operation of the print data conversion processing device 31 in the printing system according to this exemplary embodiment will be described with reference to the flowchart illustrated in FIG. 4.

After one or more print jobs transmitted from the terminal apparatus 20 have been received by the print job receiving unit 41 and have been stored in the print job memory 42, the print job attribute detecting unit 43 detects and checks the attribute information of the first print job in a print queue among the stored print jobs (step S101).

Then, the print job selecting unit 44 judges whether or not the first print job is a long job (step S102). If it is judged in step S102 that the first print job is a long job, the print job assignment control unit 45 assigns the long job to the four controller boards 471 to 474 so that the pages of the long job are processed thereby in parallel (step S103).

If it is judged in step S102 that the first print job is a short job, the print job assignment control unit 45 assigns the short job to one of the four controller boards 471 to 474 (step S104). Then, the print job selecting unit 44 judges whether or not there is a short job among the print jobs stored in the print job memory 42 (step S105). If there is no short job among the stored print jobs, the print job assignment control unit 45 ends the print job assignment process.

If it is judged in step S105 that there is a short job among the stored print jobs, the print job assignment control unit 45 assigns the short job to one of the controller boards 471 to 474 to which no print job has been assigned (step S106).

If there is a vacant controller board among the controller boards 471 to 474 (YES in step S107), the process in steps S105 and S106 is repeated, and a short job among the stored print jobs is assigned to the vacant controller board.

Finally, if there is no more vacant controller board among the controller boards 471 to 474 (NO in step S107), the process ends.

Figure 5:
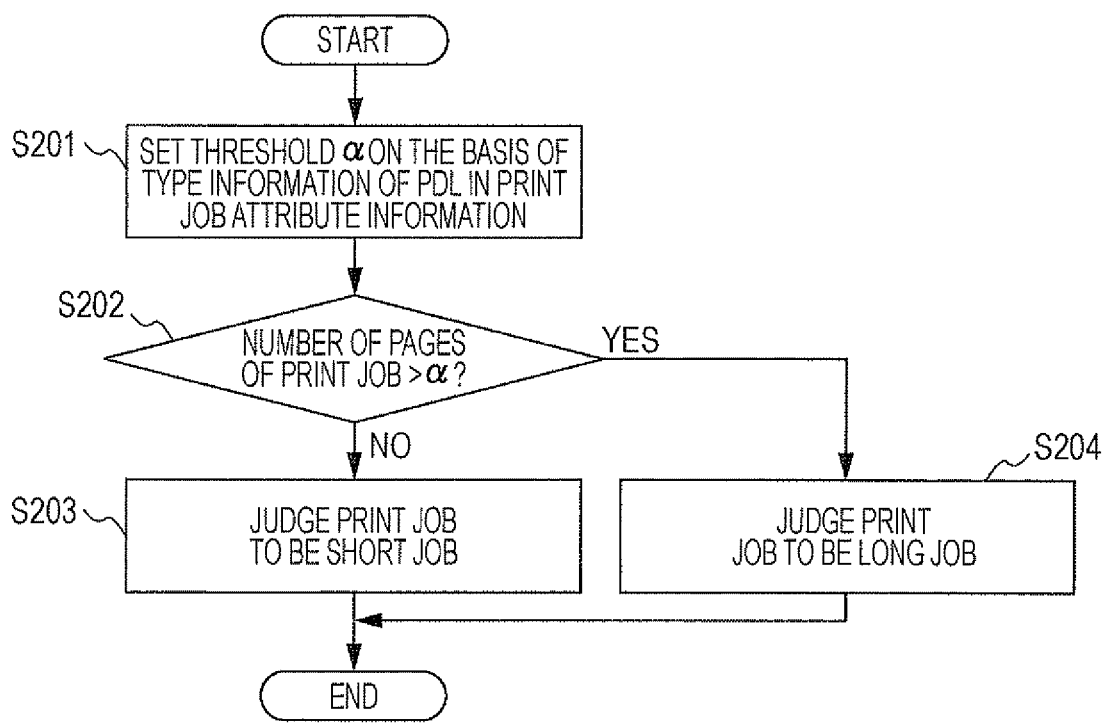
FIG. 5 is a flowchart for describing the details of a judgment process performed in the flowchart illustrated in FIG. 4.

Next, the judgment performed in step S102 in the flowchart illustrated in FIG. 4 will be described in detail with reference to the flowchart illustrated in FIG. 5. Here, a description will be given of the case of changing a threshold for judging whether a print job is a long job or a short job on the basis of the type of PDL in which a print job is described.

First, before performing judgment on a certain print job, the print job selecting unit 44 sets a threshold $\alpha$ for the print job on the basis of the print job attribute information detected by the print job attribute detecting unit 43 (step S201). For example, different thresholds $\alpha$ are set in accordance with the type of PDL, as illustrated in FIG. 6.

Then, the print job selecting unit 44 judges whether the print job is a long job or a short job on the basis of whether or not the number of pages of the print job as a judgment target is larger than the set threshold $\alpha$ (steps S202 to S204).

In the example illustrated in FIG. 6, the print job selecting unit 44 judges that a print job described in PostScript is a short job if the number of pages of the print job is eight or less, and judges that the print job is a long job if the number of pages of the print job is nine or more. Also, the print job selecting unit 44 judges that a print job described in PDF is a short job if the number of pages of the print job is twelve or less, and judges that the print job is a long job if the number of pages of the print job is thirteen or more. Also, the print job selecting unit 44 judges that a print job described in PDL is a short job if the number of pages of the print job is sixteen or less, and judges that the print job is a long job if the number of pages of the print job is seventeen or more.

In this way, the number of pages serving as a threshold is changed in accordance with the type of PDL because the number of RIP modules 62 that may be activated is small when a print job of PDL having a large processing load is to be converted into print data.

For example, four RIP modules 62 may be activated in one controller board in the case of converting a print job described in PCL into print data, but only two RIP modules 62 may be activated in one controller board in the case of converting a print job described in PostScript, which imposes a larger processing load, into print data. For this reason, the threshold $\alpha$ is changed in accordance with the type of PDL in this exemplary embodiment.

Next, operation of the print data conversion processing device 31 according to this exemplary embodiment will be described using a specific example of print jobs. For example, assume that the print jobs illustrated in FIG. 7 are stored in the print job memory 42.

In this case, the print job selecting unit 44 judges whether print job A with the highest print priority is a long job or a short job. Here, the type of PDL of print job A is PostScript, and thus the threshold $\alpha$ is eight pages. Thus, print job A, which has five pages, is judged to be a short job. Accordingly, the print job assignment control unit 45 assigns print job A to the controller board 471.

Next, the print job selecting unit 44 searches for and selects a short job from among the subsequent print jobs B to D. Here, print job B is a long job, and print jobs C and D are judged to be short jobs and are selected. Accordingly, the print job assignment control unit 45 assigns print job C to the controller board 472 and assigns print job D to the controller board 473.

Figure 8:
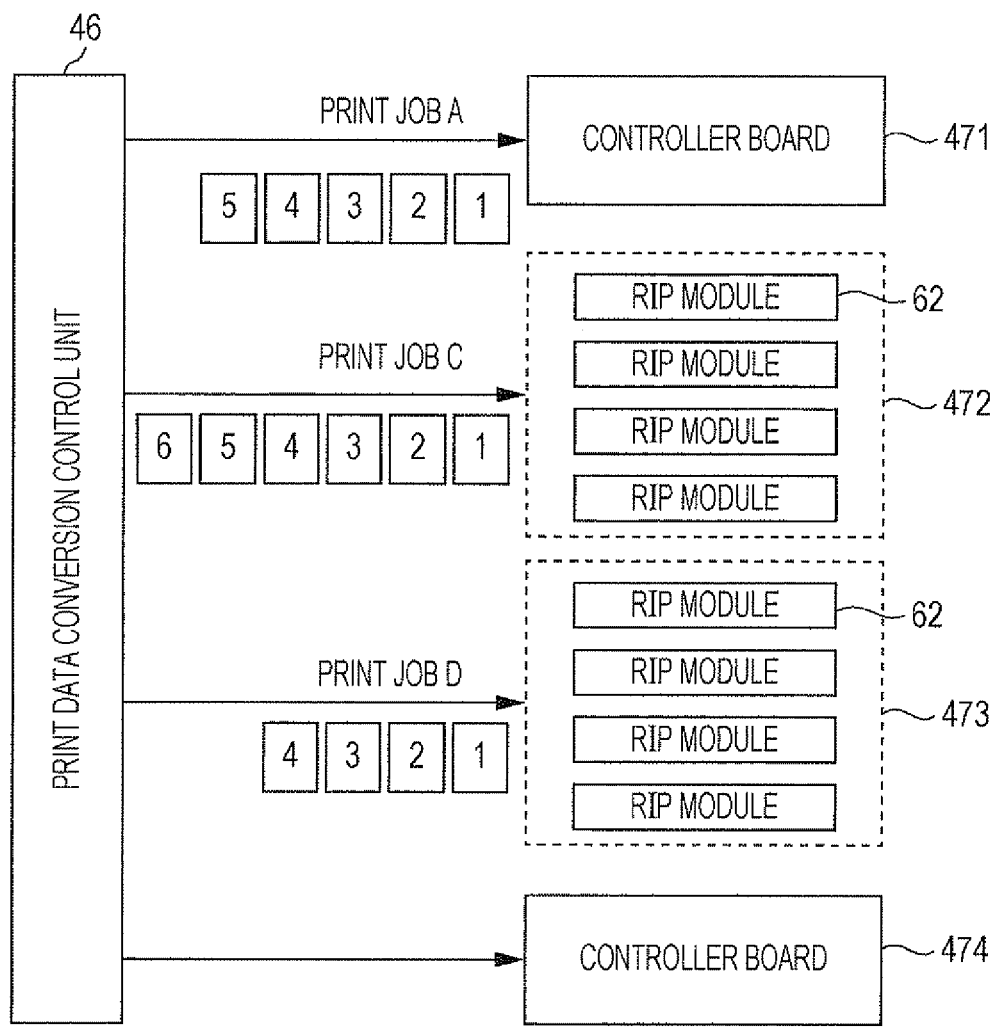
FIG. 8 is a diagram for describing a state where print jobs that have been judged to be short jobs are assigned to controller boards, respectively.

After such an assignment process has been performed, the print data conversion control unit 46 sequentially transfers the individual pages of print job A to the controller board 471, sequentially transfers the individual pages of print job C to the controller board 472, and sequentially transfers the individual pages of print job D to the controller board 473, as illustrated in FIG. 8. Then, the individual pages of print jobs A, C, and D that have been judged to be short jobs are processed in parallel by the respective RIP modules 62 of the controller boards 471 to 473 and are converted into print data.

Figure 9:
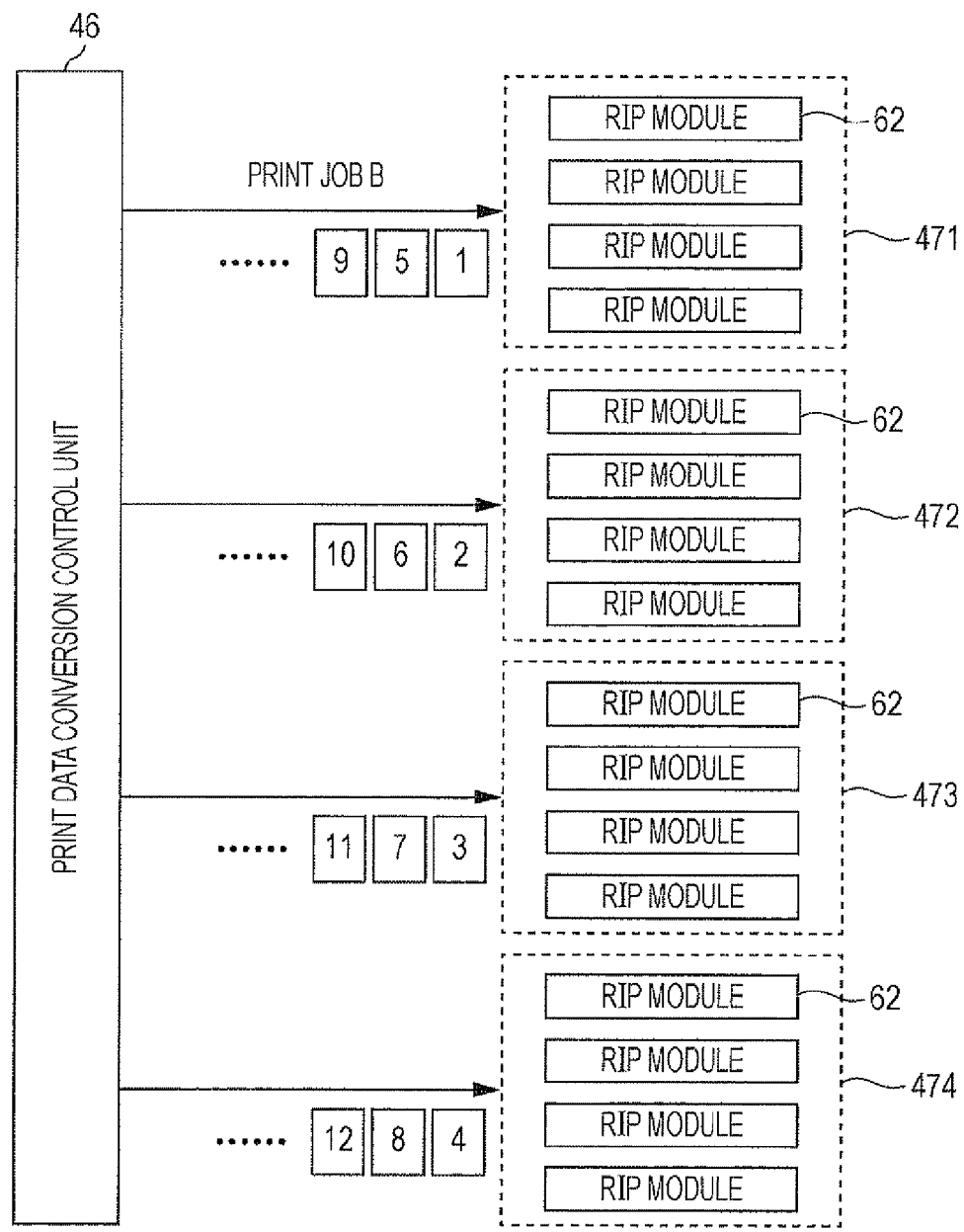
FIG. 9 is a diagram for describing a state where a print job that has been judged to be a long job is assigned to controller boards.

FIG. 9 illustrates the case of assigning print job B, which has been judged to be a long job, to the controller boards 471 to 474.

Print job B, which has been judged to be a long job, is assigned to the four controller boards 471 to 474 by the print job assignment control unit 45. Then, the print data conversion control unit 46 sequentially transfers the individual pages of print job B to the controller boards 471 to 474. In the example illustrated in FIG. 9, the first page is transferred to the controller board 471, the second page is transferred to the controller board 472, the third page is transferred to the controller board 473, and the fourth page is transferred to the controller board 474. The subsequent pages from the fifth page are also sequentially transferred to the controller boards 471 to 474 in the same manner. That is, print job B, which is a long job, is processed in parallel by all the four controller boards 471 to 474.

Exemplary Modification

In the above-described exemplary embodiment, a description has been given of the case of applying an embodiment of the invention to a printing system that performs printing on continuous paper. Alternatively, an embodiment of the invention may be applied to a printing system that performs printing on so-called cut sheets, which are printing sheets cut in advance in a certain size.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
   a plurality of conversion units each of which is capable of activating a plurality of drawing processing units that generate print data by performing a drawing process on the basis of received print jobs;
   a memory that stores received print jobs in a print queue;
   a judging unit that judges whether or not the number of pages of a received print job is larger than a set threshold;
   an assigning unit that assigns a received print job to one or more of the plurality of conversion units which are not busy processing another previously-assigned print job; and
   a selecting unit that, in a case wherein among the plurality of received print jobs stored in the memory there is at least a first print job having a number of pages greater than the set threshold and a second print job having a number of pages less than or equal to the set threshold, the selecting unit preferentially selects the second print job over the first print job from among the plurality of received print jobs stored in the memory when at least one of the plurality of conversion units is busy processing another previously-assigned print job,
   wherein the assigning unit assigns the print job selected by the selecting unit to one of the plurality of conversion units which is not busy processing another previously-assigned job.

2. The print control apparatus according to claim 1, wherein the judging unit changes the threshold for each print job on the basis of the type of page description language, which is a language for describing print content in the print job.

3. The print control apparatus according to claim 2, wherein the assigning unit assigns a print job that has been judged to have a number of pages equal to or smaller than the set threshold by the judging unit to one of the plurality of conversion units.

4. The print control apparatus according to claim 3, wherein the assigning unit assigns a print job that has been judged to have a number of pages larger than the set threshold by the judging unit to all the plurality of conversion units.

5. The print control apparatus according to claim 2, wherein the assigning unit assigns a print job that has been judged to have a number of pages larger than the set threshold by the judging unit to all the plurality of conversion units.

6. The print control apparatus according to claim 1, wherein the assigning unit assigns a print job that has been judged to have a number of pages equal to or smaller than the set threshold by the judging unit to one of the plurality of conversion units.

7. The print control apparatus according to claim 6, wherein the assigning unit assigns a print job that has been judged to have a number of pages larger than the set threshold by the judging unit to all the plurality of conversion units.

8. The print control apparatus according to claim 1, wherein the assigning unit assigns a print job that has been judged to have a number of pages larger than the set threshold by the judging unit to all the plurality of conversion units.

9. A printing system comprising:
   a plurality of conversion units each of which is capable of activating a plurality of drawing processing units that generate print data by performing a drawing process on the basis of received print jobs;
   a memory that stores received print jobs in a print queue;
   a judging unit that judges whether or not the number of pages of a received print job is larger than a set threshold;
   an assigning unit that assigns a received print job to one or more of the plurality of conversion units which are not busy processing another previously-assigned print job;
   a selecting unit that, in a case wherein among the plurality of received print jobs stored in the memory there is at least a first print job having a number of pages greater than the set threshold and second print job having a number of pages less than or equal to the set threshold, the selecting unit preferentially selects the second print job over the first print job from among the plurality of received print jobs stored in the memory when at least one of the plurality of conversion units is busy processing another previously-assigned print job; and
   an image output unit that outputs an image on the basis of print data obtained through conversion performed by the plurality of conversion units,
   wherein the assigning unit assigns the print job selected by the selecting unit to one of the plurality of conversion units which is not busy processing another previously-assigned job.

10. A non-transitory computer readable storage medium storing a program causing a computer to execute a process, the process comprising:
    judging whether or not the number of pages of a received print job in a print queue is larger than a set threshold;
    assigning the received print job to one or more of a plurality of conversion units which are not busy processing another previously-assigned print job, each of the plurality of conversion units being capable of activating a plurality of drawing processing units that generate print data by performing a drawing process on the basis of received print jobs;
    in a case wherein among a plurality of received print jobs stored in the memory there is at least a first print job having a number of pages greater than the set threshold and a second print job having a number of pages less than or equal to the set threshold, preferentially selecting the second print job over the first print job from among the plurality of received print jobs stored in the memory when at least one of the plurality of conversion units is busy processing another previously-assigned print job; and
    assigning the selected print job to one of the plurality of conversion units which is not busy processing another previously-assigned job.

* * * * *